United States Patent

[11] 3,629,784

[72] Inventors James M. Bjorn
69 18th Ave.;
Frederick Marx, Jr., 1510 North "D" St.,
both of Lake Worth, Fla. 33460
[21] Appl. No. 886,644
[22] Filed Dec. 19, 1969
[45] Patented Dec. 21, 1971

[54] ELECTRIC SWIVEL CONNECTION
10 Claims, 2 Drawing Figs.
[52] U.S. Cl. .................................................. 339/8 P,
339/14 R
[51] Int. Cl. ....................................................... H01r 39/46
[50] Field of Search ............................................ 339/5, 8, 14

[56] References Cited
UNITED STATES PATENTS
2,654,869 10/1953 Mudd, Jr. ........................ 339/8 PB
2,790,152 4/1957 Mohr .............................. 339/8 PB
FOREIGN PATENTS
1,320,114 1/1963 France ........................... 339/8 P
OTHER REFERENCES
Publication E.T.Z., pg. 106, Mar. 21, 1956, " Aus der Industrie," FIG. 3 and FIG. 4,

*Primary Examiner*—Richard E. Moore
*Attorney*—Alexander & Dowell

ABSTRACT: The electrical swivel Connection is housed in a recess in a power tool handle and has a relatively fixed section of insulating material fitting the inner end of said recess, and has an axially disposed reduced cylindrical outer end, and has an axially disposed bore extending inwardly from the outer end thereof. The rotatable section of insulating material has a larger inner end within the recess of the tool handle, and has an outer cylindrical end of reduced diameter projecting beyond the outer end of the recess. The rotatable section has a cylindrical recess in its inner end receiving the reduced cylindrical outer end of the fixed section. A first ball bearing has its inner race fixedly secured to the cylindrical outer end of the fixed section, and has its outer race fixedly secured to the inner end of the rotatable section. An electrical contact is disposed at the center of the recess in the rotatable section and a second contact is disposed at the inner end of the bore in the fixed section. A spring-biased plug in the bore establishes an electrical circuit between said contacts. A power conductor extends from the second contact through the fixed section into the handle. A second power conductor extends from the inner race through the fixed section into the handle. A second ball bearing has its inner race removably mounted on the outer cylindrical end of the rotatable section, and has its outer race engaging the wall of the recess in the handle and grounded thereto. A washer closes the outer end of the recess beyond the second ball bearing. An electric cable having three leads is connected to the outer end of the rotatable section, one lead being connected through the rotatable section with the inner race of the second ball bearing, another lead being connected through the rotatable section to the first contact of that section, and the third lead being connected through the rotatable section with the outer race of the first ball bearing.

INVENTORS
James W. Bjorn
Frederick Marx, Jr.
BY
ATTORNEYS

3,629,784

ELECTRIC SWIVEL CONNECTION

DESCRIPTION OF INVENTION

This invention is a novel electric swivel connection adapted to be mounted in the handle of a power tool or the like, same comprising a stationary section and a rotatable section which are separated by a ball bearing and are connected together in such manner as to prevent longitudinal separation of the sections. The sections are removable mounted in a cylindrical recess in the end of the handle of the power tool, the rotatable section being maintained in spaced relation with respect to the walls of the recess by means of a second ball bearing which also forms part of the ground wire circuit for electrical power leads extending through or into the rotatable section, the first ball bearing forming part of the electrical circuit for one of the power leads, and a spring-actuated contact in the fixed section normally urging the sections to separate, the spring-contact forming part of the electrical circuit for the other power lead.

The structure and function of the present electrical swivel connection is basically the same as that disclosed in our U.S. Letters Pat. No. 3,387,250 issued June 4, 1968, except that it is designed to be used in a power tool handle or the like, and is an integral part of the power leads, and has no provision for male and female connectors. Also the second ball bearing acts both as an electrical conductor for fault current, and also acts as a mechanical swivel and support bearing for the rotatable section of the swivel assembly.

One object of our invention is to provide a two-section rotatable electric connection with both sections held in their relative positions by being permanently affixed to a ball bearing. The section which is relatively stationary has a reduced extension which the inner race of the ball bearing is pressed onto, and then permanently affixed to the fixed section by a flanged or flattened plastic lip extending axially beyond the inner race, which lip is flattened over the inner race after the bearing is pressed on to prevent separation of the inner race from the fixed section.

Another object of our invention is to provide an assembly as above described in which, after the inner race is permanently affixed to the relatively fixed section, a spring and cap assembly is inserted into a center well of the fixed section, and then the rotatable section is pressed onto the outer race of the ball bearing until the locking lip engages over the outer race thereof to permanently affix the outer race to the rotatable section. Thus both sections are permanently affixed to the respective races of the ball bearing; and after assembly it is extremely difficult to separate the sections.

A further object of the invention is to provide an electrical swivel connection as above described in which the second (outer) ball bearing serves as a radial support for the rotatable section, but primarily is utilized as a ground conductor.

A further object of the invention is to provide an electrical swivel connection as above described which, as in our original concept, the spring-loaded center contact acts to urge the two sections, and the two inner races in opposite directions, thus maintaining the balls within the races in positive physical and electrical contact with the races, thus insuring continuity of the electrical circuits.

A still further object of the invention is to provide an electrical swivel connection of the above type in which, as in our original concept, by using a ball bearing containing a relatively large number of balls (approximately 43), the electric current through the device will be effectively split or divided by the number of balls as each ball corresponds to a parallel circuit. The advantage of this is, that arcing between balls and races is reduced by the same number of parallel circuits or balls, arcing being inversely proportional to the number of balls in the bearing.

Other minor objects of the invention will be hereinafter set forth.

We will explain the invention with reference to the accompanying drawings which illustrate one practical embodiment thereof to enable others familiar with the art to adopt and use the same; and will summarize in the claims the novel features of construction, and novel combinations of parts, for which protection is desired.

Figure 1:
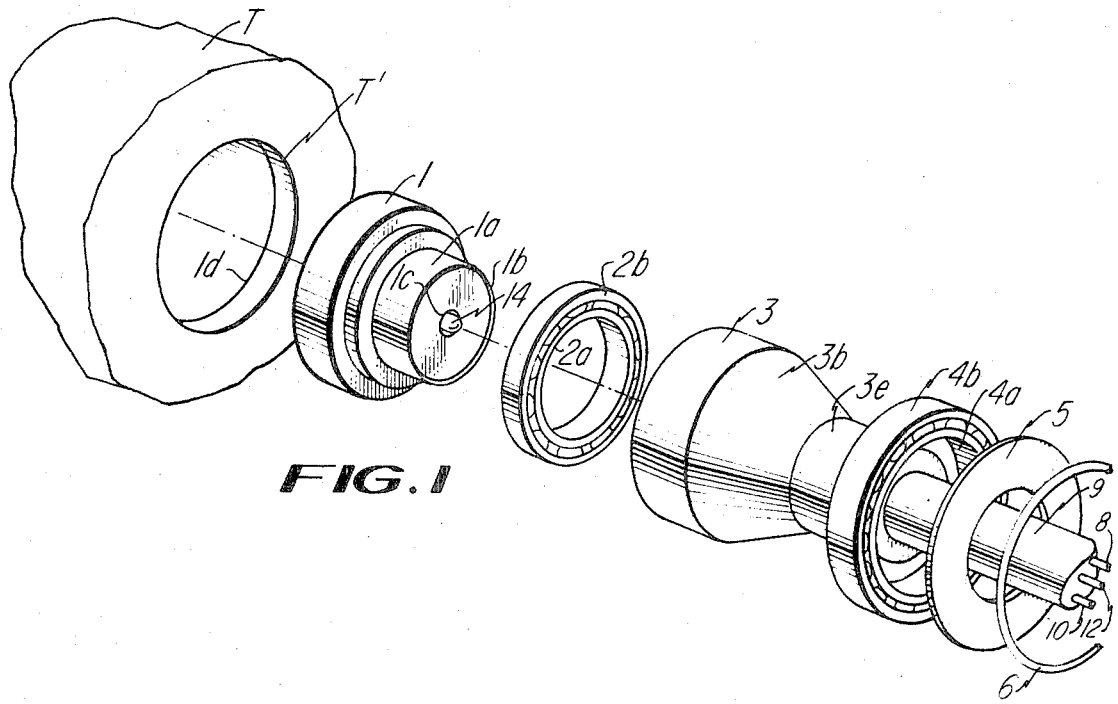
FIG. 1 is an exploded view of the parts of our novel electrical swivel connection.

As shown in the drawing, the handle of the power tool T, which is usually formed of metal, is provided in its lower end with a cylindrical recess T'. Seated in the inner end of the recess T' is a relatively fixed section 1 of the electric swivel connection which is preferably made of Bakelite or other nonconducting plastic material, the fixed section 1 being of cylindrical shape and having at its outer end a cylindrical extension 1a of reduced diameter disposed axially of the recess T'. The fixed section 1 makes a snug pressed fit into the recess T' so as to be nonrotatable therein. The outer end of the extension 1a is provided with a peripheral lip 1b for the purpose hereinafter described. Disposed axially of the fixed section 1 is a bore 1c of small diameter extending from the outer end thereof and terminating adjacent the rear end thereof.

Upon the extension 1a of fixed section 1 is a ball bearing having an inner race 2a making a press fit upon the cylindrical extension 1a and after the inner race 2a is so applied to the extension 1a, and lip 1b may be mashed or flattened over the outer face of the inner race 2a to prevent removal of the ball bearing from the extension 1a.

Figure 2:
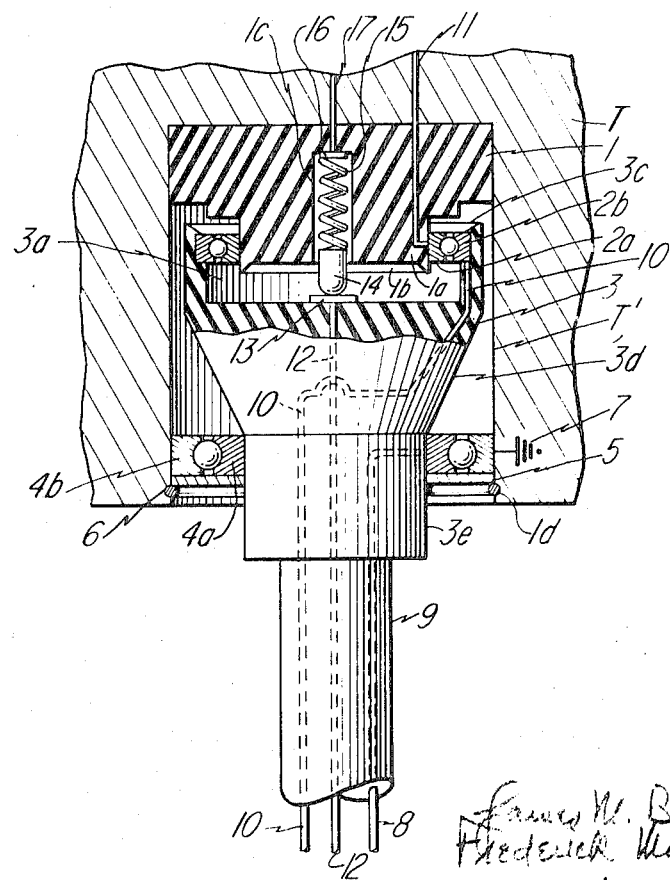
FIG. 2 is a vertical section through the parts assembled in a recess in the power tool handle.

The rotatable section 3 of the electric swivel connection is of smaller diameter than the recess T' and has an axially disposed recess 3a in its inner end of diameter sufficient to receive therein the outer race 2b of the ball bearing, also the outer end portion of the cylindrical extension 1a, which outer end is spaced from the bottom of the recess 3a, as shown in FIG. 2. The inner walls of the recess 3a of the rotatable section 3 make a press fit around the outer wall of the outer race 2b of the ball bearing, as shown in FIG. 2, and the end of the recess 3a is provided with an inturned annular lip 3c, FIG. 2, so that when the rotatable section 3 is pressed inwardly onto the outer race 2b of the ball bearing the lip 3c will make a snap-fit over the outer race 2b to prevent separation of the rotatable section 3 from the outer race 2b of the ball bearing, thus locking the sections 1 and 3 together while permitting free rotation of the rotatable section 3 upon the fixed section 1. The wall of the rotatable section 3 outwardly of the recess 3a is conically reduced as at 3d and terminates in a reduced cylindrical portion 3e, which projects out of the open end of the recess T', as shown in FIG. 2.

A second ball bearing is interposed between the reduced cylindrical portion 3e of section 3 and the wall of the recess T' adjacent its outer end, as shown in FIG. 2, the inner race 4a thereof making a sliding fit upon the reduced cylindrical portion 3e while the outer race 4b of the second ball bearing makes a snug fit against the wall of the recess T' whereby the second ball bearing will act as a mechanical swivel and support bearing for the outer end of the rotatable section 3.

In order to close the outer end of the recess T' I provide a flat washer 5 slidably engaging the wall of the recess T' and the reduced cylindrical portion 3e of the rotatable section 3, which washer is preferably held in place by means of a split ring 6 secured in an annular groove 1d in the wall of the recess T' adjacent its outer end, as shown in FIG. 2.

The ball bearings 2a–2b and 4a–4b besides acting as mechanical swivel and support bearings for the rotatable section 3 of the swivel assembly also act as electrical conductors for the power leads to the tool motor, and for fault current.

As shown in FIG. 2, the outer race 4b is grounded as at 7 to the metallic tool handle T since the outer race directly contacts the wall of the recess T'. The inner race 4a thereof is electrically connected as shown in FIG. 2 to the ground wire 8 of the electric cable 9 which is directly connected to the outer end of the rotatable section 3 forming an integral unit therewith. The electric cable 9 also contains a power lead 10 which extends through a bore therefor in the body of the rotatable section 3 and is electrically connected to the outer race 2b of the first ball bearing. The inner race 2a of the first ball bearing is electrically connected to a power lead 11 extending through a bore therefor provided in the fixed section 1, the lead 11 extending through bores in the tool handle T to one terminal of the motor (not shown) associated with the tool handle T.

The cable 9 also contains a power lead 12 extending through a bore therefore in the rotatable section 3 and is connected to a contact plate 13, FIG. 2, disposed at the bottom of the recess 3a of the rotatable section 3 opposite the reduced bore 1c. Within the reduced bore 1c is a metallic contact plug 14 which is urged outwardly of the bore 1c by a spring 15, FIG. 2, of electric conducting material so as to constantly yieldably press the contact plug 14 against the contact plate 13, the spring 15 normally urging the sections 1 and 3 to separate.

At the inner end of the bore 1c is a contact plate 16, FIG. 2, which is electrically connected to a lead extending through bores in the fixed section 1 and through the tool handle T to the other terminal of the motor associated with the tool handle T. Thus the power lead 12 of cable is constantly in electric contact through the contact plate 13, plug 14, and contact plate 16 with the power lead 17 in the tool handle T.

By the above construction the tool handle T may be rotated or manipulated at will without twisting of the cable 9 and the first ball bearing 2a–2b is utilized as part of the constant electrical circuit between the leads 10 and 11, while the lead 12 of the cable 9 is constantly in electrical circuit with the lead 17 of the power tool. Obviously the second ball bearing forms part of the ground circuit connecting the ground wire 8 of the cable 9 with the tool handle T.

Our novel swivel connection is therefore an integral part of the power leads to the tool handle T. Also, the second ball bearing 4a–4b acts both as an electrical conductor for ground or fault current and also acts as a mechanical swivel and support bearing for the rotatable section of the swivel assembly. The spring-actuated contact plug 14 in the fixed section 1 normally urges the sections 1 and 3 to separate, the spring contact forming part of the electric current for one of the power leads. The action of the spring 15 of the center plug 14 acts to urge the two sections 1 and 3 to separate axially causing both bearings to be thrusted to maximum engagement; thus maintaining the balls within the races in positive physical and electrical contact with the races, thus insuring continuity of the electric circuits through the bearings. By using a relatively large number of balls in each ball bearing, the electric circuit through the bearings will be effectively split or divided between the number of balls since each ball corresponds to a parallel circuit, thereby preventing arcing between the balls and races owing to the relatively large number of parallel circuits through the balls.

We claim:

1. In combination with a power tool handle having a cylindrical recess therein, an electrical swivel connection comprising a fixed section of insulating material at the inner end of said recess, and having an axially disposed reduced cylindrical outer end, and having an axially disposed bore extending inwardly from said outer end; a rotatable section of insulating material having a larger inner end disposed within the recess and having a reduced outer cylindrical end projecting beyond the recess; said rotatable section having a cylindrical recess in its inner end receiving the outer end of the fixed section; a first ball bearing having its inner race fixedly secured to the said cylindrical outer end of the fixed section, and having its outer race fixedly secured within the recess of the rotatable section; and electrical contact in the recess in the rotatable section; a second contact in the bore in the fixed section; a spring-biased contact plug in the said bore electrically connecting said contacts; a power conductor extending from the second contact through the fixed section into the handle; a second power conductor extending from the inner race through the fixed section into the handle; a second ball bearing having its inner race removable mounted on the outer cylindrical end of the rotatable section, and having its outer race engaging the wall of the recess in the handle and grounded thereto; means for closing the outer end of the recess beyond the second ball bearing; an electric cable connected to the outer end of the rotatable section having three leads, and one lead being connected through the rotatable section with the inner race of the second ball bearing, another lead being connected through the rotatable section of the first contact of said section, and the third lead being connected through the rotatable section with the outer race of the first ball bearing.

2. In a combination as set forth in claim 1, an outer edge of the reduced cylindrical outer end of the fixed section having a lip adapted to be flattened over an outer face of the inner race of the first ball bearing to lock the said race to the fixed section.

3. In combination as set forth in claim 1, an inner edge of the rotatable section having an internal lip adapted to snap-fit over an inner face of the outer race of the first ball bearing to lock the rotatable section to said race.

4. In a combination as set forth in claim 1, said spring-biased contact plug urging the sections to separate axially thereby maintaining the balls within the races of the ball bearings in positive physical and electrical contact insuring continuity of the electrical circuits therethrough.

5. In a combination as set forth in claim 4, said ball bearings containing a relatively large number of balls respectively thereby dividing the electric current therethrough into a number of parallel circuits corresponding with the number of balls, to prevent arcing.

6. In combination with a power tool handle having a cylindrical recess therein, an electrical swivel connection comprising a relatively fixed section of insulating material snugly fitting the inner end of said recess, and having an axially disposed reduced cylindrical outer end, and having an axially disposed bore extending from said outer end terminating short of the inner end of said section; a rotatable section of insulating material having a larger inner end within the recess of less diameter than the recess and an outer cylindrical end of reduced diameter projecting beyond the outer end of the recess; said rotatable section having a cylindrical recess in its inner end receiving the cylindrical outer end of the fixed section; a first ball bearing having its inner race fixedly secured to the said cylindrical outer end of the fixed section, and having its outer race fixedly secured to the inner end of the rotatable section; an electrical contact at the center of the recess in the rotatable section; a second contact at the inner end of the bore in the fixed section; a spring-biased contact plug in the said bore establishing an electrical circuit between said contacts; a power conductor extending from the second contact through the fixed section into the handle; a second power conductor extending from the inner race through the fixed section into the handle; a second ball bearing having its inner race removably mounted on the outer cylindrical end of the rotatable section, and having its outer race engaging the wall of the recess in the handle and grounded thereto; a washer closing the outer end of the recess beyond the second ball bearing; a split ring in the recess maintaining the washer in position; an electric cable connected to the outer end of the rotatable section and having three leads, one lead being connected through the rotatable section with the inner race of the second ball bearing, another lead being connected through the rotatable section to the first contact of said section, and the third lead being connected through the rotatable section with the outer race of the first ball bearing.

7. In a combination as set forth in claim 6, an outer edge of the reduced cylindrical outer end of the fixed section having a lip adapted to be flattened over an outer face of the inner race of the first ball bearing to lock the said race to the fixed section.

8. In a combination as set forth in claim 6, an inner edge of the rotatable section having an internal lip adapted to snap-fit over an inner face of the outer race of the first ball bearing to lock the rotatable section to said race.

9. In a combination as set forth in claim 6, said spring-biased contact plug urging the sections to separate axially thereby maintaining the balls within the races of the ball bearings in positive physical and electrical contact insuring continuity of the electrical circuits therethrough.

10. In a combination as set forth in claim 9, said ball bearings containing a relatively large number of balls respectively thereby dividing the electric current therethrough into a number of parallel circuits corresponding with the number of balls, to prevent arcing.

* * * * *